US010965161B2

(12) United States Patent
Jung et al.

(10) Patent No.: US 10,965,161 B2
(45) Date of Patent: Mar. 30, 2021

(54) WIRELESS POWER RECEIVING APPARATUS AND METHOD

(71) Applicants: SAMSUNG ELECTRONICS CO., LTD., Suwon-si (KR); Korea Advanced Institute of Science and Technology, Daejeon (KR)

(72) Inventors: Seungchul Jung, Suwon-si (KR); Gyu Hyeong Cho, Daejeon (KR); Sang Joon Kim, Hwaseong-si (KR); JongPal Kim, Seoul (KR); Se Un Shin, Pohang-si (KR); Min Seong Choi, Seoul (KR); Seok Tae Koh, Seoul (KR); Yu Jin Yang, Cheongju-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 192 days.

(21) Appl. No.: 16/043,384

(22) Filed: Jul. 24, 2018

(65) Prior Publication Data
US 2019/0027967 A1    Jan. 24, 2019

(30) Foreign Application Priority Data
Jul. 24, 2017    (KR) .................. 10-2017-0093763

(51) Int. Cl.
*H02J 50/12*    (2016.01)
*H02J 7/02*    (2016.01)
*H02J 50/05*    (2016.01)

(52) U.S. Cl.
CPC .............. *H02J 50/12* (2016.02); *H02J 7/025* (2013.01); *H02J 50/05* (2016.02)

(58) Field of Classification Search
CPC .. H02J 50/12; H02J 50/10; H02J 50/80; H02J 50/60; H02J 50/40; H02J 7/025;
(Continued)

(56) References Cited

U.S. PATENT DOCUMENTS 9,088,167 B2 *    7/2015    Kim .................. H02J 5/005
9,685,814 B1 *    6/2017    Moyer ............... H02J 7/00034
(Continued)

FOREIGN PATENT DOCUMENTS

KR    10-2012-0093358 A    8/2012
KR    10-2012-0131973 A    12/2012
(Continued)

OTHER PUBLICATIONS

Enhanced RF to DC converter with LC resonant circuit by L J Gabrillo et al. 2015 IOP Conf. Ser.: Mater. Sci. Eng. 79 012011 Published 2015.*
(Continued)

*Primary Examiner* — Rexford N Barnie
*Assistant Examiner* — Jagdeep S Dhillon
(74) *Attorney, Agent, or Firm* — NSIP Law

(57) ABSTRACT

A wireless power receiving apparatus includes a receiving resonator configured to wirelessly receive energy; a resonant converter configured to transfer, to an output end of the wireless power receiving apparatus, energy of an energy storage device connected among a plurality of energy storage devices; and a controller configured to accumulate, alternatingly in the energy storage devices, the energy received, and select the energy storage device to be connected to the resonant converter from the energy storage devices.

20 Claims, 11 Drawing Sheets

(58) Field of Classification Search
CPC ..... H02J 7/02; H02J 7/00; H02J 5/005; H04B 5/0037; H04B 5/00; H04B 5/0068; H01F 38/14; B60L 53/12; B60L 53/38; G06K 19/07; G06K 19/0712
USPC ................ 307/104, 149, 64, 82, 80, 109, 66
See application file for complete search history.

(56) References Cited

U.S. PATENT DOCUMENTS

| | | | |
|---|---|---|---|
| 2010/0323616 A1* | 12/2010 | Von Novak | H02J 7/342 455/41.1 |
| 2011/0130093 A1 | 6/2011 | Walley et al. | |
| 2012/0161531 A1* | 6/2012 | Kim | H02J 50/12 307/104 |
| 2012/0328043 A1* | 12/2012 | Kwon | H04B 5/0081 375/295 |
| 2013/0069586 A1 | 3/2013 | Jung et al. | |
| 2013/0207601 A1 | 8/2013 | Wu et al. | |
| 2013/0257167 A1 | 10/2013 | Singh | |
| 2014/0111156 A1 | 4/2014 | Lee et al. | |
| 2015/0207333 A1* | 7/2015 | Baarman | H02J 50/12 307/104 |
| 2015/0233987 A1 | 8/2015 | Von Novak, III et al. | |
| 2016/0094047 A1 | 3/2016 | Finkenzeller et al. | |
| 2017/0033838 A1* | 2/2017 | Kwon | H04B 5/0037 |
| 2017/0063103 A1* | 3/2017 | Do | H02J 50/12 |

FOREIGN PATENT DOCUMENTS

| | | |
|---|---|---|
| KR | 10-2015-0052991 A | 5/2015 |
| KR | 10-2016-0145150 A | 12/2016 |

OTHER PUBLICATIONS

Almasi, Omid Naghash et al., "Analysis, control and design of a non-inverting buck-boost converter: A bumb-less two-level T-S fuzzy PI control", *ISA Transactions*, 2017, (pp. 515-527).

Extended European Search Report dated Dec. 5, 2018 in corresponding European Application No. 18185297.1 (8 pages in English).

Ahn, Dukju, et al., "Wireless Power Transfer with Automatic Feedback Control of Load Resistance Transformation." *IEEE Transactions on Power Electronics*, vol. 31, No. 11, Nov. 2016 (pp. 7876-7886).

Choi, Myungjoon, et al. "A Resonant Current-Mode Wireless Power Receiver and Battery Charger With-32 dBm Sensitivity for Implantable Systems", *IEEE Journal of Solid-State Circuits*, vol. 51, No. 12, Dec. 2016 (pp. 2880-2892).

* cited by examiner

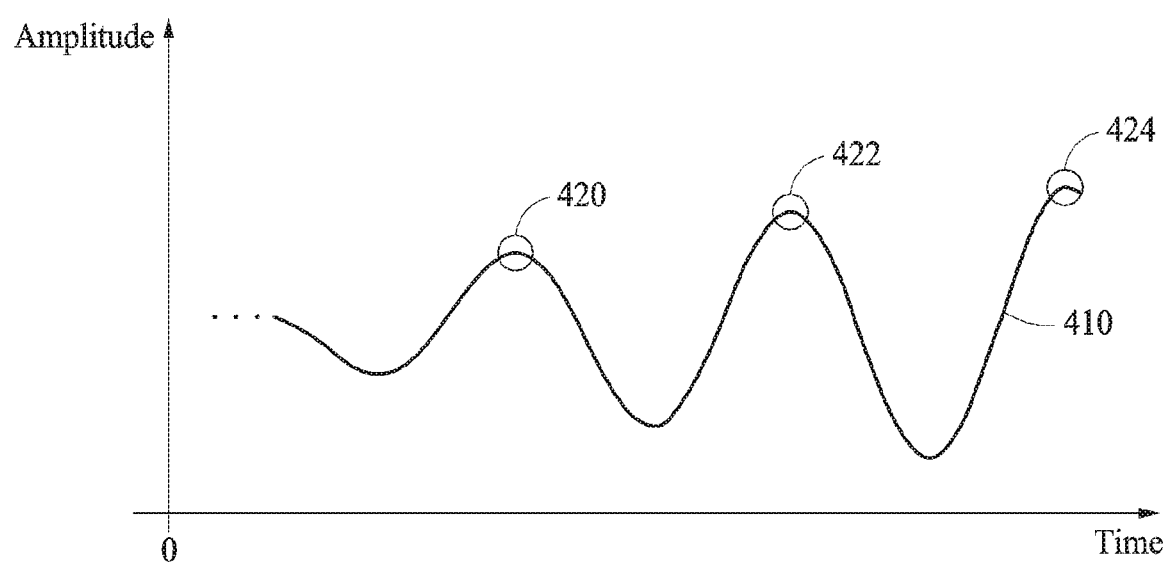

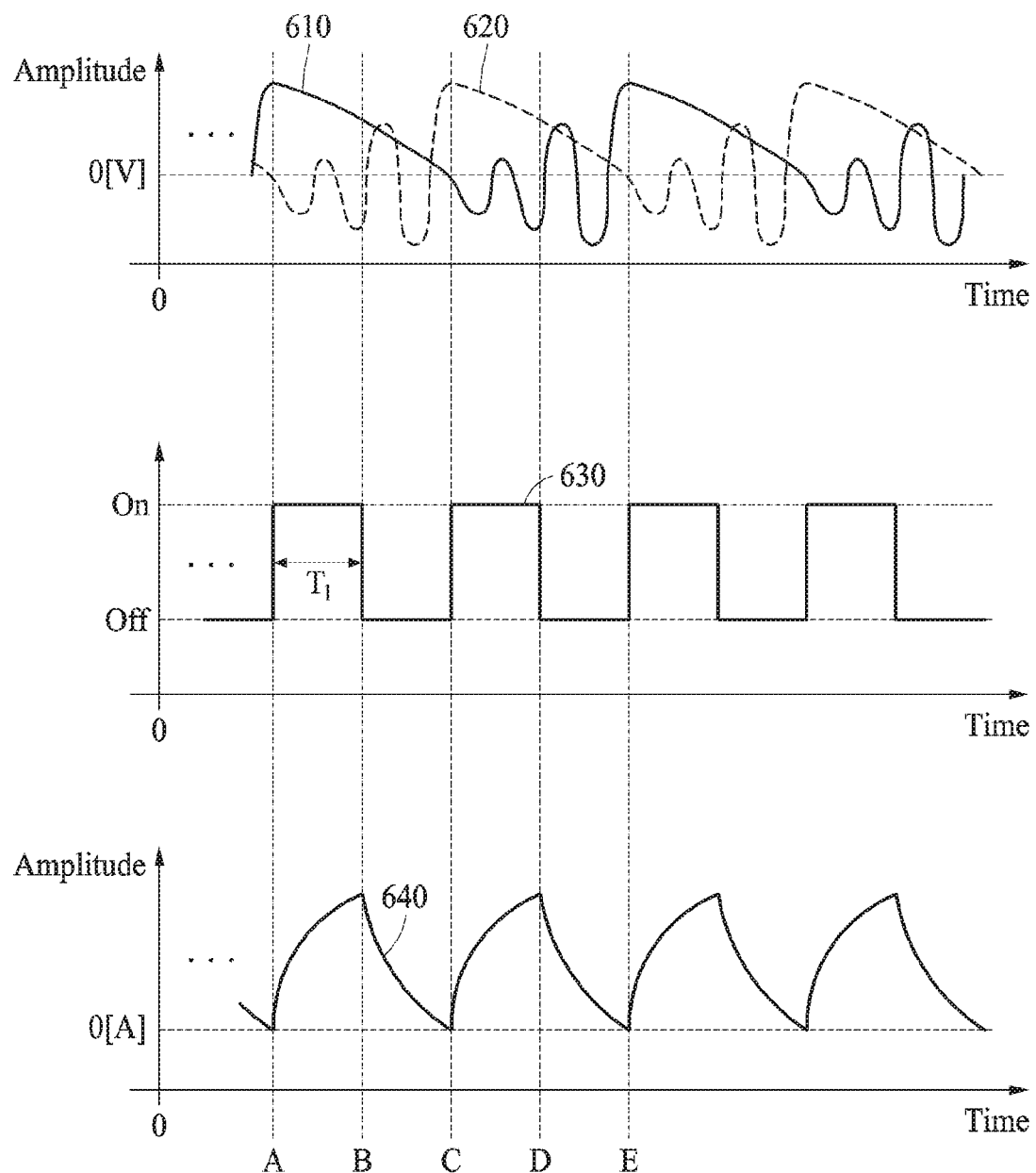

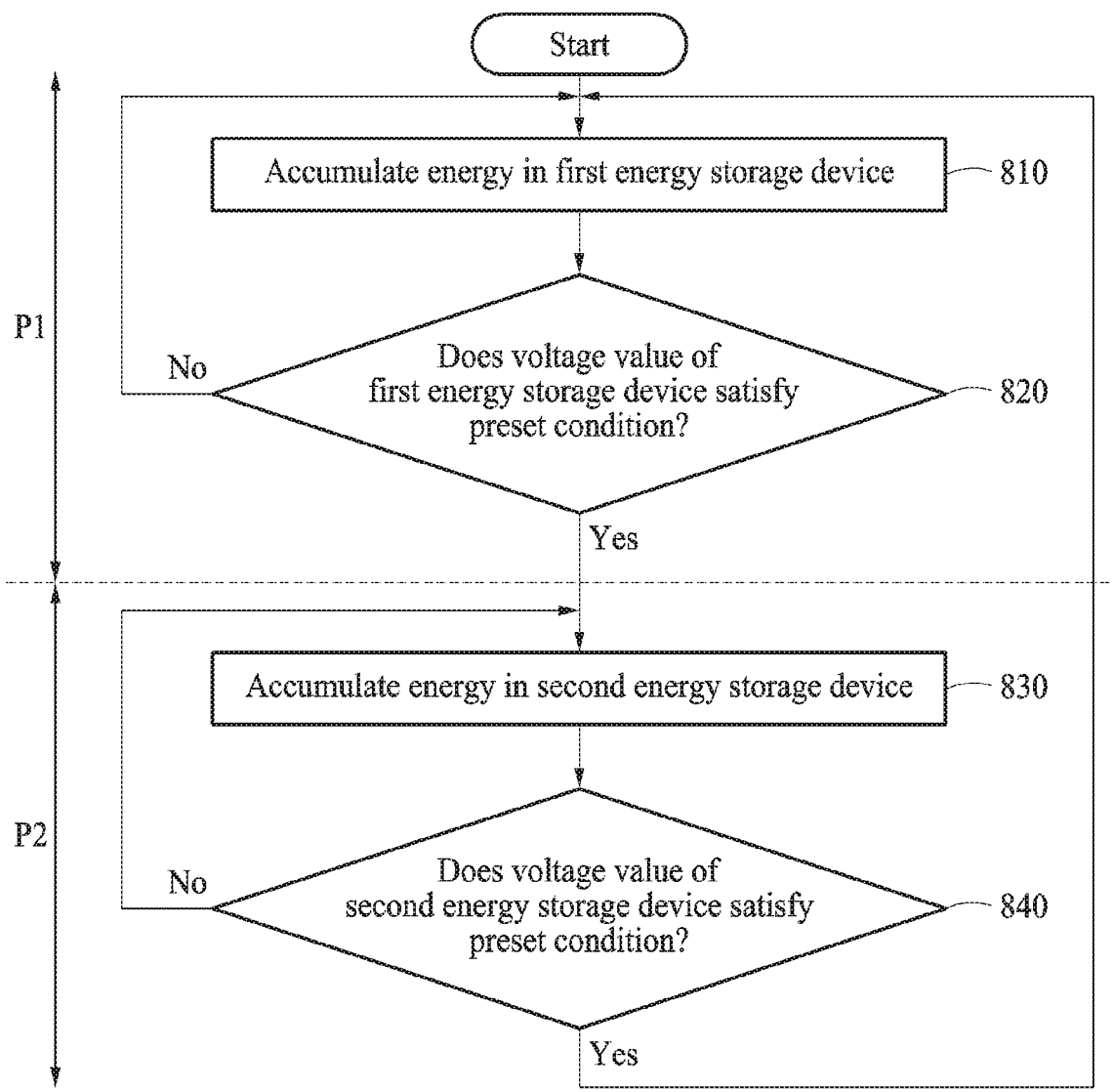

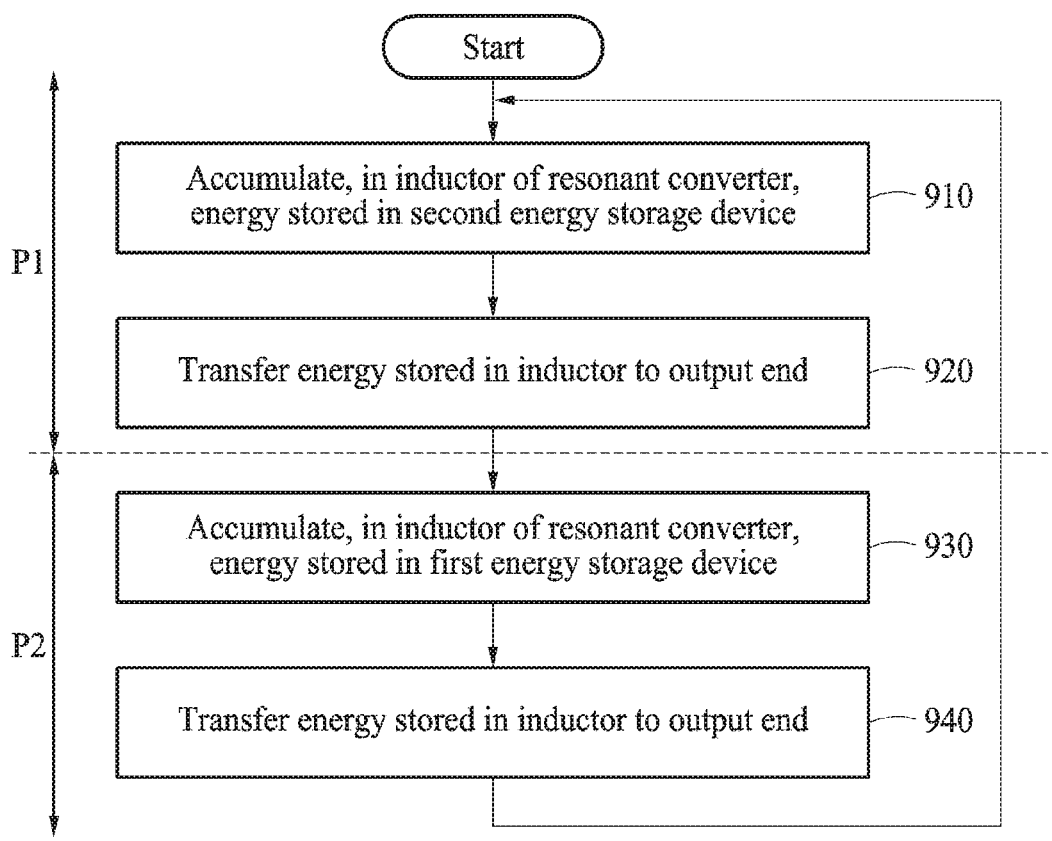

WIRELESS POWER RECEIVING APPARATUS AND METHOD

CROSS-REFERENCE TO RELATED APPLICATIONS

This application claims the benefit under 35 USC § 119(a) of Korean Patent Application No. 10-2017-0093763 filed on Jul. 24, 2017, in the Korean Intellectual Property Office, the entire disclosure of which is incorporated herein by reference for all purposes.

BACKGROUND

1. Field

The following description relates to wireless power transmission technology.

2. Description of Related Art

Research on wireless power transmission is conducted to help resolve inconvenience in wired power supplies to various electrical devices including portable devices and overcome or mitigate issues related to the myriad problems flowing from the limited capacity of batteries. Research continuously expands and intensifies in fields such as near-field wireless power transmission. The near-field power transmission refers to a type of wireless power transmission that is performed when a distance between a transmitting coil and a receiving coil is sufficiently shorter compared to a wavelength of the operating frequency of the transmission. Such a wireless power transmission may be performed by a wireless power transmitting apparatus configured to wirelessly supply power and a wireless power receiving apparatus configured to receive the power from the wireless power transmitting apparatus, generally at such distances.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power receiving apparatus includes a receiving resonator configured to wirelessly receive energy; a resonant converter configured to transfer, to an output end of the wireless power receiving apparatus, energy of an energy storage device connected among a plurality of energy storage devices; and a controller configured to accumulate, alternatingly in the energy storage devices, the energy received, and select the energy storage device to be connected to the resonant converter from the energy storage devices.

The controller may be configured to control the wireless power receiving apparatus such that energy received from the receiving resonator is accumulated in a first energy storage device and energy stored in a second energy storage device is transferred to the resonant converter, during a first time interval, and control the wireless power receiving apparatus such that energy stored in the first energy storage device is transferred to the resonant converter and energy received from the receiving resonator is accumulated in the second energy storage device, during a second time interval.

The controller may be configured to control an operation of a first switch to determine which one of the receiving resonator and the resonant converter is to be connected to the first energy storage device, and an operation of a second switch to determine which one of the receiving resonator and the resonant converter is to be connected to the second energy storage device.

The controller may be configured to accumulate energy wirelessly received in another energy storage device, while the energy of the connected energy storage device is being transferred to the output end.

The controller may be configured to detect a peak point of a voltage value of an energy storage device in which the energy received from the transmitting resonator is accumulated, and replace the energy storage device with another energy storage device in which the energy is to be accumulated in response to the detected peak point satisfying a preset condition.

The receiving resonator may include a first inductor to wirelessly receive the energy through resonant inductive coupling, and the resonant converter may include a second inductor having an inductance greater than an inductance of the first inductor.

The resonant converter may be configured to accumulate, in the second inductor, energy stored in the current energy storage device during a first period in a first time interval, and transfer energy stored in the second inductor to the output end during a second period in the first time interval.

The resonant converter may further include a switch to control the first period and the second period in the first time interval.

The resonant converter may further include a diode disposed between the second inductor and the output end.

The second inductor may be connected to the connected energy storage device in series.

The energy storage devices may be or may include capacitors.

In another general aspect, a wireless power receiving apparatus includes a receiving resonator configured to wirelessly receive energy; energy storage devices configured to either one or both of store the received energy and supply the stored energy; and a controller configured to select, from the energy storage devices, an energy storage device to store the energy wirelessly received and an energy storage device configured to supply energy to an output end of the wireless power receiving apparatus.

The apparatus may further include a resonant converter configured to transfer, to the output end, energy of an energy storage device currently connected.

In another general aspect, a wireless power receiving method includes accumulating energy wirelessly received in a first energy storage device and transferring energy stored in a second energy storage device to an output end through a resonant converter, during a first time interval; and accumulating energy wirelessly received in the second energy storage device and transferring energy stored in the first energy storage device to the output end through the resonant converter, during a second time interval.

The accumulating of the energy in the first energy storage device and the transferring of the energy stored in the second energy storage device to the output end may include accumulating the energy stored in the second energy storage device in an inductor included in the resonant converter during a first period in the first time interval; and transferring the energy stored in the inductor to the output end during a second period in the first time interval.

The accumulating of the energy in the second energy storage device and the transferring of the energy stored in the first energy storage device to the output end may include accumulating the energy stored in the first energy storage device in an inductor included in the resonant converter during a first period in the second time interval; and transferring the energy stored in the inductor to the output end during a second period in the second time interval.

The method may further include detecting a peak point of a voltage value of the first energy storage device during the first time interval, and in response to the detected peak point satisfying a preset condition, accumulating energy received by the receiving resonator in the second energy storage device.

The method may further include detecting a peak point of a voltage value of the second energy storage device during the second time interval; and in response to the detected peak point satisfying a preset condition, accumulating energy received by the receiving resonator in the first energy storage device.

The accumulating energy wirelessly received in the first energy storage device and transferring energy stored in the second energy storage device to the output end through the resonant converter, during the first time interval may be substantially simultaneously performed.

In another general aspect, a wireless power receiving method includes actuating a processor to receive energy at a receiving resonator; transfer, to an output, energy of an energy storage device connected among a plurality of energy storage devices; and accumulate, alternatingly in the energy storage devices, the energy received, and select the energy storage device to be connected to a resonant converter from the energy storage devices.

Other features and aspects will be apparent from the following detailed description, the drawings, and the claims.

BRIEF DESCRIPTION OF THE DRAWINGS

FIG. 4 is a diagram illustrating an example of a waveform of an output signal of a capacitor included in a receiving resonator.

FIGS. 5A and 5B, and 6 are diagrams illustrating an example of an energy transfer method performed using a resonant converter.

FIG. 8 is a flowchart illustrating an example of operations of a receiving resonator of a wireless power receiving apparatus.

FIG. 9 is a flowchart illustrating an example of operations of a resonant converter of a wireless power receiving apparatus.

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
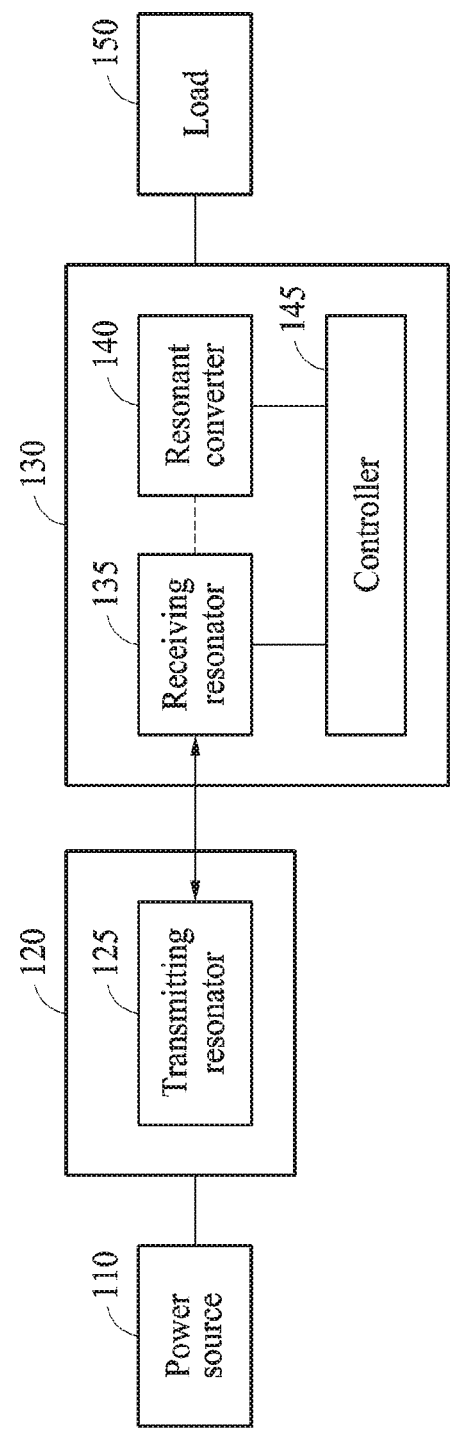
FIG. 1 is a diagram illustrating an example of a wireless power transmission system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s) for purposes of clarity and brevity. For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. For example, as used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, components or one or more combinations/groups thereof in one or more example embodiments, but do not preclude the presence or addition of one or more other features, integers, operations, elements, components, and/or combinations/groups thereof in alternative embodiments, nor the lack of such stated features, integers, operations, elements, and/or components, and/or combinations/groups in further alternative embodiments unless the context and understanding of the present disclosure indicates otherwise. In addition, the use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 is a diagram illustrating an example of a wireless power transmission system.

A wireless power transmission system may be applied to various systems that need wireless power transmission or wireless charging. The wireless power transmission system may be applied to wirelessly transmit energy to various devices, for example, a wearable device, an implantable device, a healthcare device, a smartphone, a home appliance, and an electric vehicle, or any suitable device. The term, energy, may be interchangeably used herein with power. The wireless power transmission system may be used to remotely supply energy to a rechargeable battery included in such devices acting as or incorporating a wireless power receiver described in the foregoing.

Referring to FIG. 1, the wireless power transmission system includes a wireless power transmitting apparatus 120 configured to wirelessly transmit energy to a wireless power receiving apparatus 130, and the wireless power receiving apparatus 130 configured to wirelessly receive energy from the wireless power transmitting apparatus 120. The wireless power transmitting apparatus 120 includes a transmitting resonator 125, and the wireless power receiving apparatus 130 includes a receiving resonator 135, a resonant converter 140, and a controller 145.

Each of the transmitting resonator 125 and the receiving resonator 135 includes an inductor. Through an electromagnetic induction between the respective inductors of the transmitting resonator 125 and the receiving resonator 135, energy may be remotely transmitted from the wireless power transmitting apparatus 120 to the wireless power receiving apparatus 130. The wireless power transmitting apparatus 120 may receive energy from a power source 110, and store the received energy in the transmitting resonator 125. In a case in which the receiving resonator 135 having a resonant frequency equal to that of the transmitting resonator 125 is located at a distance sufficiently close to mutually resonate with the transmitting resonator 125, resonant inductive coupling may occur between the transmitting resonator 125 and the receiving resonator 135. Through the resonant inductive coupling, the receiving resonator 135 may wirelessly receive energy from the transmitting resonator 125, and the energy received by the receiving resonator 135 may be stored in an energy storage device, such as, for example, a capacitor. The wireless power receiving apparatus 130 may transfer the energy stored in the energy storage device to a load 150 that is connected to an output end (for example, the end connected to the load 150) of the wireless power receiving apparatus 130 through the resonant converter 140. The load 150, for example, one or more rechargeable batteries and a power-consuming electronic component, may be connected to the wireless power receiving apparatus 130. The wireless power receiving apparatus 130 may transfer energy to the load 150 using the resonant converter 140, in lieu of a rectifier and an energy transfer path including a converter connected to the rectifier, and thus may provide a higher efficiency. Alternatively, a circuit that is controlled in real time through a communicator, in lieu of a battery, may be connected to the output end.

In such a process described in the foregoing, using a plurality of energy storage devices included in the wireless power receiving apparatus 130, the wireless power receiving apparatus 130 may separately perform an operation of receiving energy from the wireless power transmitting apparatus 120 and an operation of transferring stored energy to the load 150 through the resonant converter 140. Thus, efficiency in wireless power transmission may be improved irrespective of the load 150. How the efficiency is improved will be described in greater detail hereinafter.

The controller 145 may control an overall operation of the wireless power receiving apparatus 130. The controlling may be performed by one or more control signals output from the controller 145. The controller 145 may select, from the energy storage devices, an energy storage device in which energy received through the receiving resonator 135 is to be stored and an energy storage device from which stored energy is to be extracted. The controller 145 may accumulate energy received from the transmitting resonator 125 alternately or selectively in the energy storage devices, and select an energy storage device to be connected to the resonant converter 140 from the energy storage devices. The resonant converter 140 may transfer, to the output end, energy of a current energy storage device, which is a currently connected energy storage device among the energy storage devices, and the controller 145 may accumulate energy transferred from the transmitting resonator 125 in another energy storage device while the energy of the current energy storage device is being transferred to the output end through the resonant converter 140. The resonant converter 140 may separately perform an operation of accumulating energy stored in the current energy storage device in an inductor included in the resonant converter 140, and an operation of transferring the energy accumulated in the inductor to the load 150 connected to the output end.

In an example, during a first time interval, the controller 145 may control the wireless power receiving apparatus 130 such that energy received from the receiving resonator 135 is accumulated in a first energy storage device, and energy stored in a second energy storage device is transferred to the resonant converter 140. Here, the resonant converter 140 may accumulate the energy stored in the second energy storage device in the inductor included in the resonant converter 140 during a first period in the first time interval, and transfer the energy stored in the inductor to the output end during a second period in the first time interval. Here, both the first period and the second period in the first time interval are included in the first time interval. The resonant converter 140 includes a switch to control the first period and the second period in the first time interval, and an operation of the switch may be controlled by the controller 145.

Also, during a second time interval, the controller 145 may control the wireless power receiving apparatus 130 such that energy received from the receiving resonator 135 is accumulated in the second energy storage device, and energy stored in the first energy storage device is transferred to the resonant converter 140. Here, the resonant converter 140 may accumulate the energy stored in the first energy storage device in the inductor included in the resonant converter 140 during a first period in the second time interval, and transfer the energy stored in the inductor to the output end during a second period in the second time interval. Here, both the first period and the second period in the second time interval are included in the second time interval. When the second time interval is terminated, an operation performed in the first time interval may be performed again. Thus, the operation performed in the first time interval and an operation performed in the second time interval may be performed alternately and repeatedly as time elapses.

The controller 145 may control the operations described in the foregoing by controlling operations of switches included in the wireless power receiving apparatus 130. For example, the controller 145 controls an operation of a switch to determine which one of the receiving resonator 135 and the resonant converter 140 is to be connected to the first energy storage device, and an operation of a switch to determine which one of the receiving resonator 135 and the resonant converter 140 is to be connected to the second energy storage device.

As described, the wireless power receiving apparatus 130 may separately perform an operation of receiving energy from the wireless power transmitting apparatus 120, and an operation of transferring energy to the load 150, and may thus improve efficiency in wireless power transmission from a wireless power transmitting end to a wireless power receiving end irrespective of the load 150. Hereinafter, operations of the wireless power receiving apparatus 130 will be described in greater detail.

Figure 2:
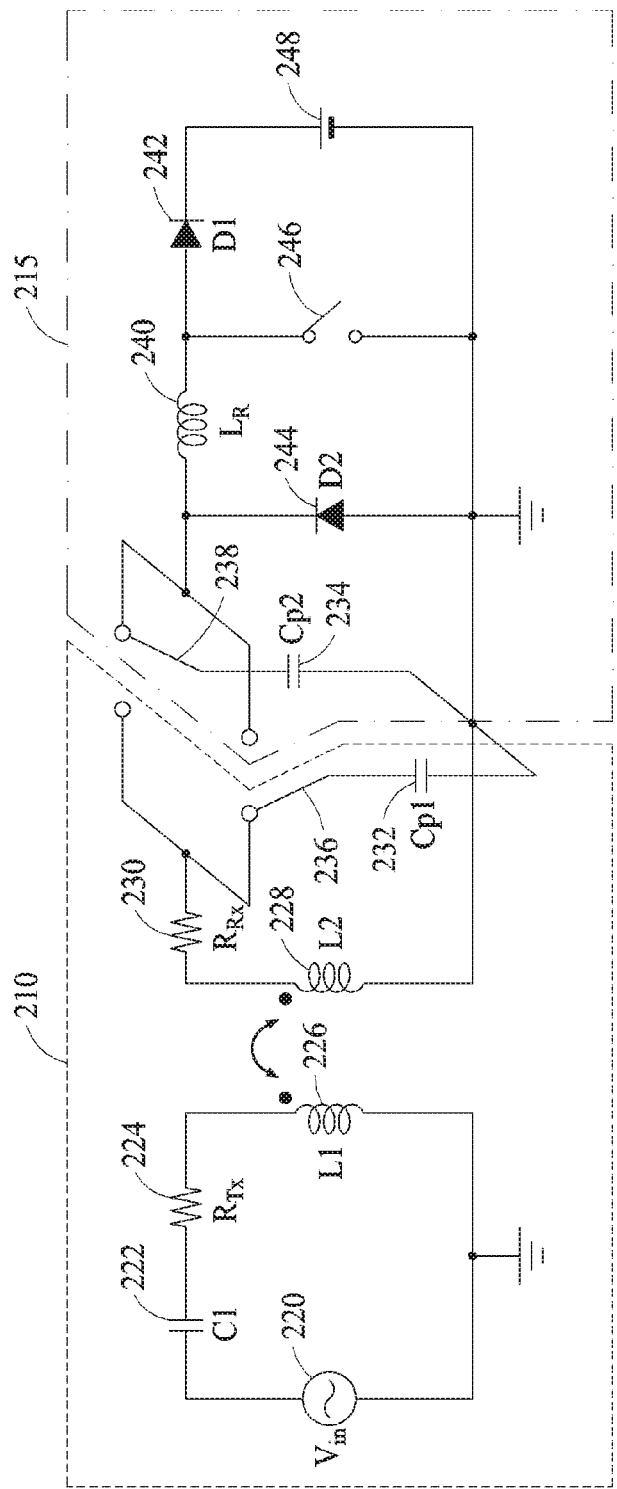
FIG. 2 is a diagram illustrating an example of an equivalent circuit of a wireless power transmitting apparatus and a wireless power receiving apparatus.

FIG. 2 is a diagram illustrating an example of an equivalent circuit of a wireless power transmitting apparatus and a wireless power receiving apparatus.

Referring to FIG. 2, operations of a wireless power transmission system are divided into a first portion 210 in which energy is transferred from a wireless power transmitting apparatus to a wireless power receiving apparatus, and a second portion 215 in which energy stored in the wireless power receiving apparatus is transferred to a load such as a battery 248. Such a division between the first portion 210 and the second portion 215 may be enabled by controlling connections of a plurality of energy storage devices, for example, a capacitor Cp1 232 and a capacitor Cp2 234, through switches 236 and 238. For example, as the switches 236 and 238, an active element configured to connect or disconnect components may be used.

In the first portion 210, a transmitting resonator of the wireless power transmitting apparatus includes a capacitor C1 222, a resistor $R_{Tx}$ 224, and an inductor L1 226. The transmitting resonator receives energy from a power source $V_{in}$ 220 and accumulates the received energy in the inductor L1 226. A receiving resonator of the wireless power receiving apparatus includes an inductor L2 228, a resistor $R_{Rx}$ 230, and the capacitor Cp1 232, which is a currently connected energy storage device. The inductor L2 228 of the receiving resonator receives energy from the inductor L1 226 of the transmitting resonator through resonant inductive coupling. The energy transferred to the inductor L2 228 is accumulated in the capacitor Cp1 232.

As described, while energy is being accumulated in the capacitor Cp1 232 in the first portion 210, energy stored in the capacitor Cp2 234 is transferred to the load through a resonant converter in the second portion 215. At a point in time, the resonant converter includes the capacitor Cp2 234, a diode D1 242 disposed between the capacitor Cp2 234 and an output end of the wireless power receiving apparatus, and a switch 246. For example, as the switch 246, an active element configured to connect or disconnect components may be used. Depending on an example, a diode D2 244 may be included in the resonant converter. In the resonant converter, when the switch 246 is initially turned on, energy stored in the capacitor Cp2 234 starts accumulating in an inductor $L_R$ 240. Subsequently, when the switch 246 is turned off, energy accumulated in the inductor $L_R$ 240 is supplied to the battery 248 through the output end. Here, turning on or off a switch may indicate activating or inactivating the switch, or opening or closing the switch to determine whether to connect or disconnect components. The inductor $L_R$ 240 included in the resonant converter may have an inductance sufficiently greater than that of the inductor L2 228 of the receiving resonator, for example, an inductance more than ten times greater than that of the inductor L2 228. Since the inductor $L_R$ 240 has the sufficiently greater inductance than the inductor L2 228, a conduction loss and a peak current may be reduced.

When the operations described in the foregoing are completed, a controller, for example, the controller 145, of the wireless power receiving apparatus changes a connection associated with the switches 236 and 238. Thus, the receiving resonator then includes the capacitor Cp2 234, not the capacitor Cp1 232, and energy transferred from the transmitting resonator begins to accumulate in the capacitor Cp2 234. In addition, the resonant converter then includes the capacitor Cp1 232, not the capacitor Cp2 234, and energy stored by being accumulated in the Cp1 232 in the preceding operation is then accumulated in the inductor $L_R$ 240 and supplied to the battery 248.

Such operations described in the foregoing may be performed repeatedly, and thus the receiving resonator may continuously accumulate energy that is wirelessly received from the transmitting resonator. The wireless power receiving apparatus may thus continuously accumulate energy using the capacitor Cp1 232 and the capacitor Cp2 234, alternately. The wireless power receiving apparatus may receive a greater amount of energy from the wireless power transmitting apparatus by separating the capacitor Cp1 232 and the capacitor Cp2 234, and thus a resistance value at a wireless power transmitting end may be adjusted and an improved efficiency may be obtained.

Figure 3A:
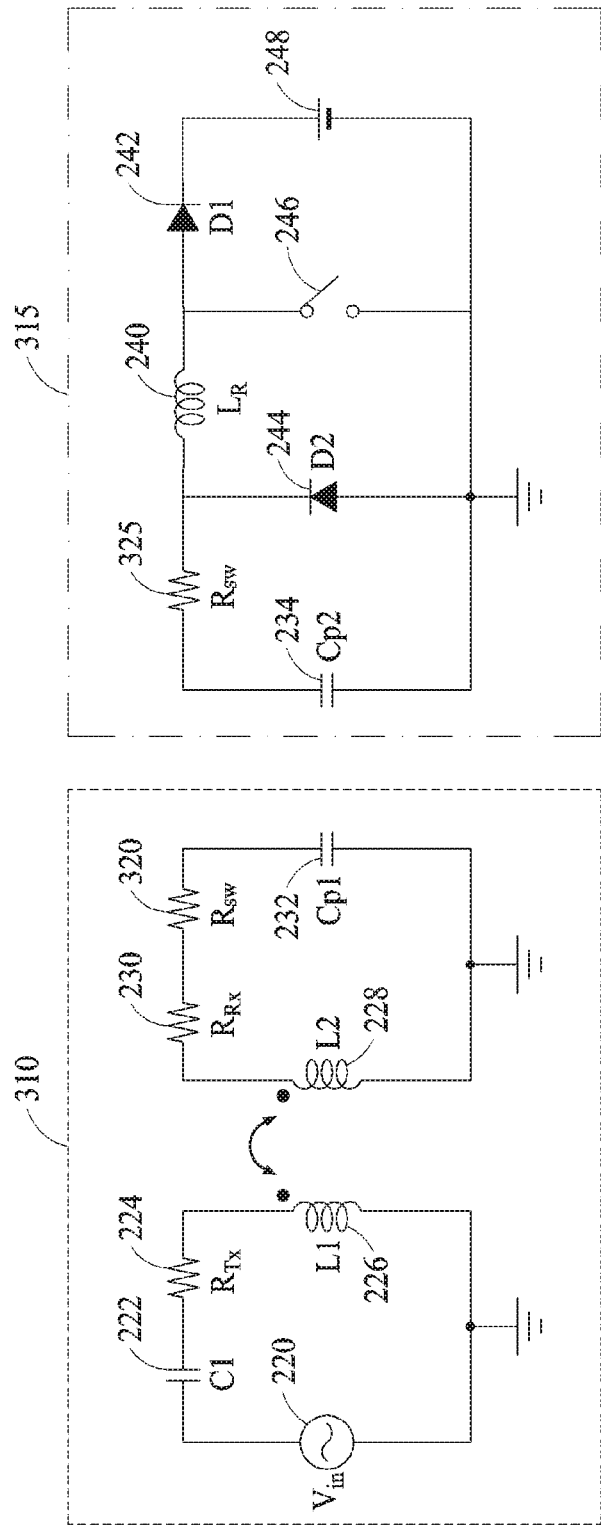
FIGS. 3A and 3B are diagrams illustrating examples of operations of a wireless power receiving apparatus.
Figure 3B:
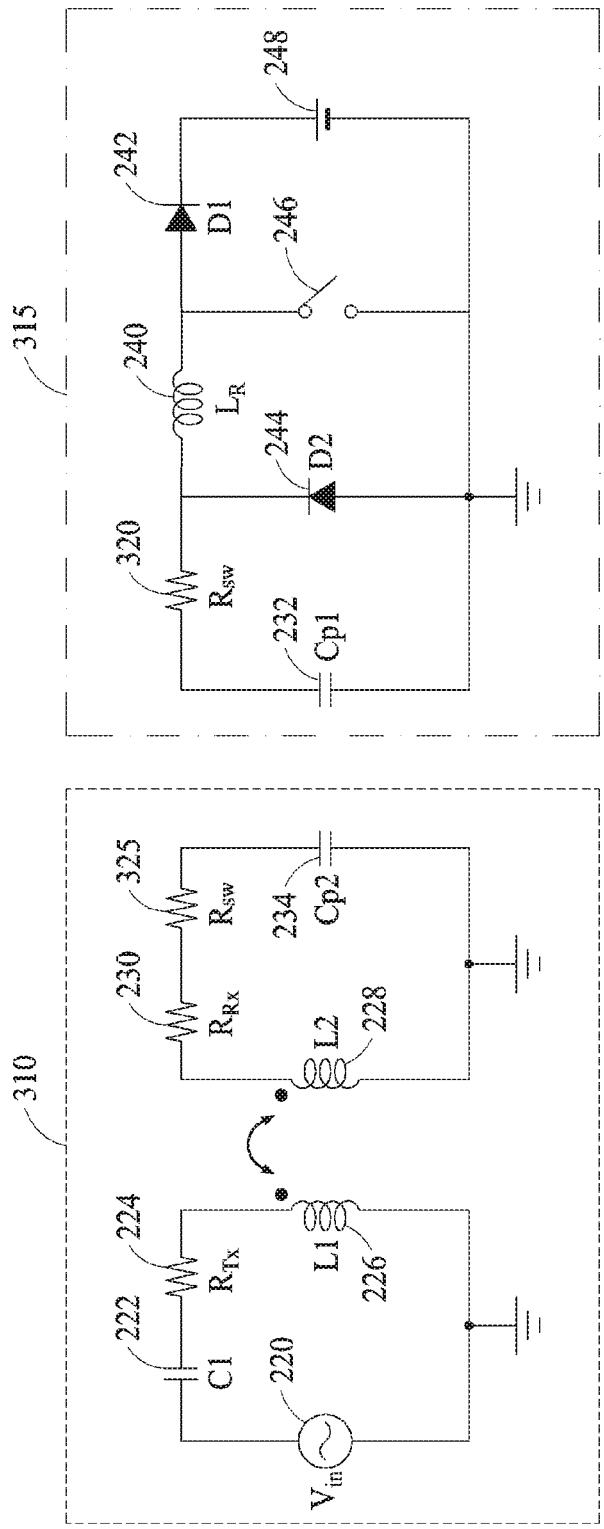

FIGS. 3A and 3B are diagrams illustrating examples of an equivalent circuit divided into a first portion 310 in which energy is transferred from a wireless power transmitting apparatus to a wireless power receiving apparatus and a second portion 315 in which energy stored in the wireless power receiving apparatus is transferred to a battery 248, in a first time interval and a second time interval.

Referring to FIG. 3A, dissimilar to the example of FIG. 2, the switch 236 of FIG. 2 is illustrated in FIG. 3A as a resistor $R_{SW}$ 320, and the switch 238 of FIG. 2 is illustrated in FIG. 3A as a resistor $R_{SW}$ 325, which are impedance elements. In the first time interval, energy is stored in the capacitor Cp1 232, and energy stored in the capacitor Cp2 234 is accumulated in the inductor $L_R$ 240 and then transferred to the battery 248. Referring to FIG. 3B, in the second time interval, energy is stored in the capacitor Cp2 234, and energy stored in the capacitor Cp1 232 is accumulated in the inductor $L_R$ 240 and then transferred to the battery 248. Thus, the wireless power receiving apparatus may separate an operation of receiving energy from the wireless power transmitting apparatus, and an operation of transferring stored energy to an output end, using a plurality of energy storage devices which may be selectively applied in, for example, alternating manner.

Here, efficiency in transferring energy from a wireless power transmitting end to a wireless power receiving end may be calculated as represented by Equation 1.

$$\frac{\frac{(\omega M)^2}{R_{Rx} + R_{sw}}}{R_{Tx} + \frac{(\omega M)^2}{R_{Rx} + R_{sw}}} \times E_{Rx} \qquad \text{[Equation 1]}$$

In Equation 1, a resulting value is associated with a ratio of a power value of both output ends of the transmitting resonator to a power value of both ends of a power source, for example, the power source $V_{in}$ 220, of the wireless power transmitting end, and may apply a magnitude of the efficiency in transferring energy from the wireless power transmitting end to the wireless power receiving end. In Equation 1, M and ω denote a mutual inductance between the inductor L1 226 and the inductor L2 228, and an angular velocity component of the power source $V_{in}$ 220, respectively. $R_{Tx}$ and $R_{Rx}$ denote a resistance value of the resistor $R_{Tx}$ 224 and a resistance value of the resistor $R_{Rx}$ 230, respectively. $R_{SW}$ denotes a resistance value of the resistor $R_{SW}$ 320 in the first time interval, and a resistance value of the resistor $R_{SW}$ 325 in the second time interval. $E_{RX}$ denotes an efficiency of the receiving resonator, and depends on a number of times of resonance. As represented by Equation 1 above, the efficiency may have a value irrespective of a load, and a relatively high efficiency may be achieved because a value of $R_{SW}$ may be extremely small in general.

The controller 145 selects one from the capacitor Cp1 232 and the capacitor Cp2 234 to be included in the receiving resonator, and one from the capacitor Cp1 232 and the capacitor Cp2 234 to be included in the resonant converter. In an example, the controller 145 performs such a selecting operation based on an output voltage value of a capacitor to be included in the receiving resonator. FIG. 4 is a diagram illustrating an example of a waveform 410 of an output signal of a capacitor included in a receiving resonator. When the capacitor Cp1 232 is included in the receiving resonator, at a point in time, and energy transferred from the transmitting resonator is accumulated therein, an output voltage at both ends of the capacitor Cp1 232 changes as illustrated in FIG. 4. When a number of resonance in the transmitting resonator increases, the output voltage of the capacitor Cp1 232 has a plurality of peak points 420, 422, and 424 as illustrated in FIG. 4. For example, when the output voltage of the capacitor Cp1 232 increases to be greater than a threshold value, or a preset number of peak points is detected from the output voltage, the controller 145 may change a connection of the switches 236 and 238 such that the capacitor Cp1 232 is included, actuated, or reconfigured in the resonant converter and the capacitor Cp2 234 is included, actuated, or reconfigured in the receiving resonator.

For example, when a peak point is detected from an output voltage of the capacitor Cp1 232 after the receiving resonator resonates N times through the capacitor Cp1 232, the controller 145 changes a connection of the switch 236 to allow the capacitor Cp1 232 to be included in the resonant converter. Here, N denotes a natural number. Simultaneously, the controller 145 changes a connection of the switch 238 to allow the capacitor Cp2 234 to be included in the receiving resonator. Here, a value of N, which is the number of resonance by the receiving resonator, may be changeable or controllable. For example, in a case in which a value of N is 3, and the peak point 424 is a third peak point of the output voltage of the capacitor Cp1 232, the capacitor Cp1 232 is controlled to be included in the resonant converter and the capacitor Cp2 234 is controlled to be included in the receiving resonator, when the peak point 424 is detected.

Figure 5A:
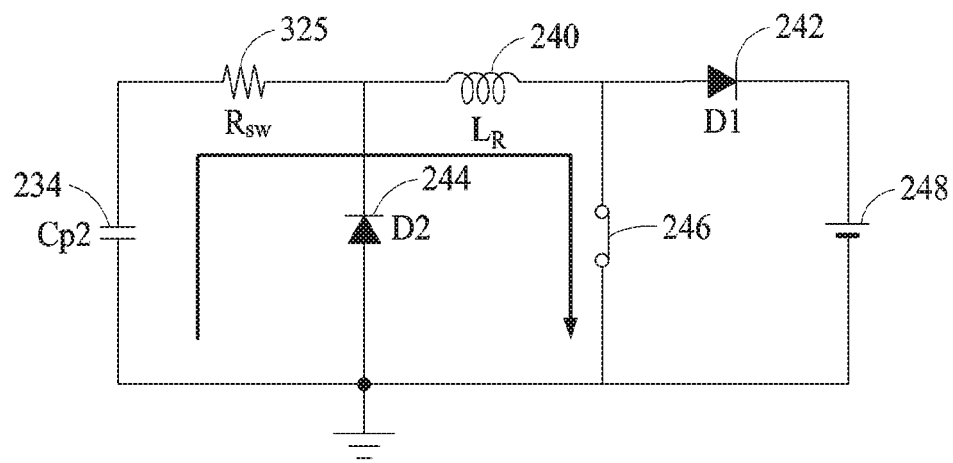
Figure 5B:
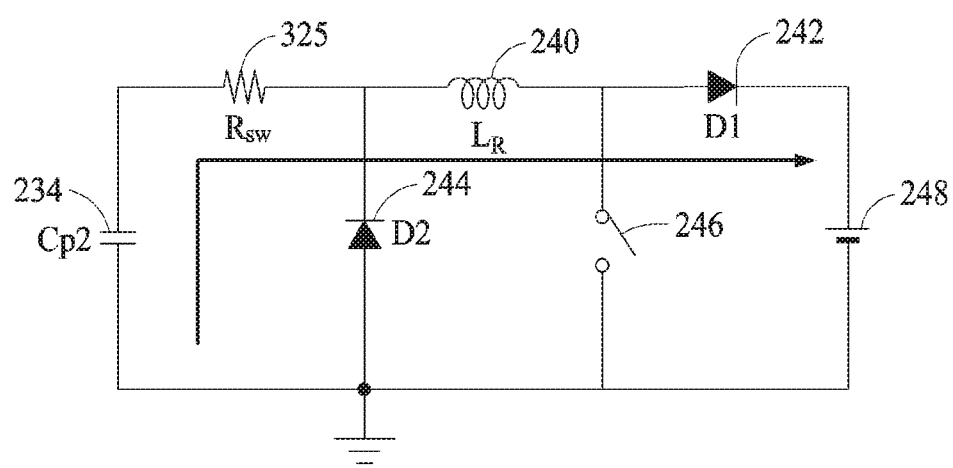

FIGS. 5A and 5B, and 6 are diagrams illustrating an example of an energy transfer method performed using a resonant converter.

FIG. 5A is a diagram illustrating an example of an equivalent circuit in a case in which the switch 246 is turned on after the capacitor Cp2 234 is included in the resonant converter. As illustrated, when the switch 246 is turned on or connected, a current path in which a current flows in order starting from the capacitor Cp2 234, the resistor $R_{SW}$ 325, the inductor $L_R$ 240, and the switch 246 is formed. Through such a current path, an amount of energy stored in the capacitor Cp2 234 may be gradually reduced, and energy stored in the capacitor Cp2 234 may be started being accumulated in the inductor $L_R$ 240. Thus, a voltage between both ends of the capacitor Cp2 234 may gradually decrease, and an inductor current flowing through the inductor $L_R$ 240 may gradually increase.

When an operation of increasing the inductor current of the inductor $L_R$ 240 is completed, the controller 145 turns off or disconnects the switch 246 as illustrated in FIG. 5B. When the switch 246 is turned off, a current path in which a current flows in order starting from the capacitor Cp2 234, the resistor $R_{SW}$ 325, the inductor $L_R$ 240, and the diode D1 242 is formed. Through such a current path, energy stored in the inductor $L_R$ 240 may be transferred to the battery 248 connected to the output end. Thus, the voltage between both ends of the capacitor Cp2 234 may gradually decrease, and the inductor current flowing through the inductor $L_R$ 240 may gradually decrease.

Subsequently, the capacitor Cp1 232, in lieu of the capacitor Cp2 234, is included or connected in the resonant converter, and the operations described above with reference to FIGS. 5A and 5B may be performed repeatedly. Here, energy stored in the capacitor Cp1 232, not the capacitor Cp2 234, is accumulated in the inductor $L_R$ 240, and then energy accumulated in the inductor $L_R$ 240 is transferred to the battery 248. Other operations may be the same or similar to those illustrated in FIGS. 5A and 5B.

FIG. 6 is a diagram illustrating an output voltage 610 of the capacitor Cp2 234, an output voltage 620 of the capacitor Cp1 232, a control signal 630 applied to the switch 246, and a waveform of an inductor current 640 of the inductor $L_R$ 240.

As a first operation, in a time interval between A and C, the capacitor Cp1 232 is included in the receiving resonator, and energy received from the transmitting resonator is gradually accumulated in the capacitor Cp1 232 through resonance. Here, the capacitor Cp2 234 is included in the resonant converter, and energy stored in the capacitor Cp2 234 is gradually reduced. In a period between A and B in the time interval between A and C, the switch 246 of the resonant converter is turned on based on the control signal 630, and energy is accumulated in the inductor $L_R$ 240 and the inductor current 640 gradually increases. The output voltage 610 of the capacitor Cp2 234 gradually decreases. In a period between B and C in the time interval between A and C, the switch 246 of the resonant converter is turned off based on the control signal 630, energy accumulated in the inductor $L_R$ 240 is transferred to the output end, and the inductor current 640 gradually decreases. A boost duty T1, which is a time interval in which the switch 246 is on, may be changed appropriately. In an example, a length of the boost duty T1 may be determined to be a value at which, at a point in time C, the inductor current 640 of the inductor $L_R$ 240 and the output voltage 610 of the capacitor Cp2 234 are greater than or equal to 0.

As a second operation, in a time interval between C and E, the capacitor Cp2 234 is included in the receiving resonator, and energy received from the transmitting resonator is gradually accumulated in the capacitor Cp2 234 through resonance. Here, the capacitor Cp1 232 is included in the resonant converter, and energy stored in the capacitor Cp1 232 is gradually reduced. At the point in time C, capacitors to be included in the receiving resonator and the resonant converter may be replaced through the controller 145. In a period between C and D in the time interval between C and E, the switch 246 of the resonant converter is turned on based on the control signal 630, the inductor current 640 of the inductor $L_R$ 240 gradually increases, and the output voltage 610 of the capacitor Cp1 232 gradually decreases. In a period between D and E in the time interval between C and E, the switch 246 of the resonant converter is turned off based on the control signal 630, and energy accumulated in the inductor $L_R$ 240 is transferred to the output end. The inductor current 640 gradually decreases.

The first and second operations may be performed alternately and repeatedly.

Figure 7:
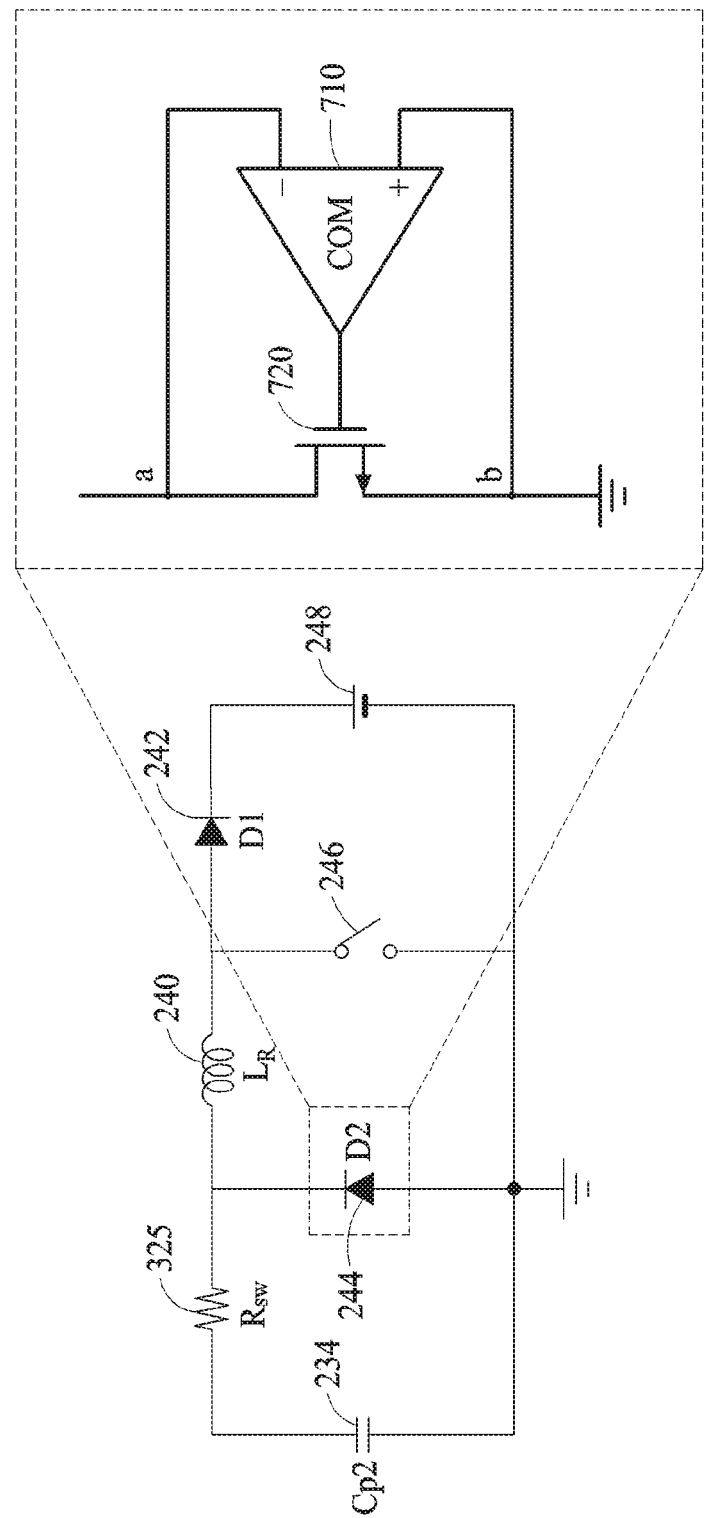
FIG. 7 is a diagram illustrating an example of a method of determining a boost duty of a resonant converter.

FIG. 7 is a diagram illustrating an example of a method of determining a boost duty of a resonant converter.

During a boost duty described above with reference to FIG. 6, energy is accumulated in the inductor $L_R$ 240, and an inductor current gradually increases. To minimize a root mean square (RMS) current and improve efficiency, a substantially optimal boost duty may need to be determined. In a case in which a voltage at both ends of a capacitor included in the resonant converter decreases to be less than 0 volts (V) and thus becomes a negative voltage, a current may flow through the diode D2 244, which is not, generally, a desirable situation. Thus, while energy is being transferred to the output end through the resonant converter, the optimal boost duty that may not allow a current to flow through the diode D2 244 may need to be determined. As illustrated in FIG. 7, the diode D2 244 is configured as including a comparator 710 and a transistor 720, and the optimal boost duty may be determined by gradually adjusting a length of the boost duty based on an output of the comparator 710 while the resonant converter is operating.

For example, when a voltage at an input end a of the comparator 710 is determined to be greater than a voltage at an input end b of the comparator 710 as a result of the output of the comparator 710, the length of the boost duty may be decreased. Conversely, when the voltage at the input end a is determined not to be greater than the voltage at the input end b, the length of the boost duty may be increased. By performing such an operation repeatedly, an optimal, or substantially optimal, length of the boost duty may be determined. The optimal boost duty may be when energy stored in the capacitor Cp2 234 and energy stored in the inductor $L_R$ 240 become 0, when an operation of transferring energy of the capacitor Cp2 234 currently connected from the resonant converter to the output end is terminated.

FIG. 8 is a flowchart illustrating an example of operations of a receiving resonator of a wireless power receiving apparatus.

Referring to FIG. 8, in operation 810, the wireless power receiving apparatus accumulates energy wirelessly received from a transmitting resonator in a first energy storage device included in the receiving resonator. Here, a second energy storage device, which is another energy storage device different from the first energy storage device, is included in a resonant converter.

In operation 820, the wireless power receiving apparatus determines whether a voltage value of the first energy storage device satisfies a preset condition. For example, the wireless power receiving apparatus may determine whether the voltage value, or an absolute value of the voltage value, of the first energy storage device is greater than a threshold value. For another example, the wireless power receiving apparatus may detect a peak point or a maximum point of the voltage value of the first energy storage device, and determine whether the detected peak point satisfies a preset condition, for example, whether a predefined N-th peak point is detected or not. In response to the voltage value of the first energy storage device not satisfying the condition, the wireless power receiving apparatus continuously accumulates energy in the first energy storage device. In response to the voltage value of the first energy storage device satisfying the condition, the wireless power receiving apparatus accumulates energy received by the receiving resonator in the second energy storage device. The wireless power receiving apparatus controls connections of components therein such that the second energy storage device, in lieu of the first energy storage device, is included in the receiving resonator, and the first energy storage device is included in the resonant converter.

In operation 830, the wireless power receiving apparatus accumulates energy wirelessly received from the transmitting resonator in the second energy storage device. In operation 840, the wireless power receiving apparatus determines whether a voltage value of the second energy storage device satisfies a preset condition. For example, similarly to operation 820, the wireless power receiving apparatus may determine whether the voltage value of the second energy storage device is greater than a threshold value, or whether a peak point of the voltage value of the second energy storage device satisfies a preset condition. In response to the voltage value of the second energy storage device not satisfying the condition, the wireless power receiving apparatus continuously accumulates energy in the second energy storage device. In response to the voltage value of the second energy storage device satisfying the condition, the wireless power receiving apparatus accumulates energy received by the receiving resonator again in the first energy storage device.

Here, a first time interval during which operations 810 and 820 are performed is referred to as P1, and a second time interval during which operations 830 and 840 are performed is referred to as P2.

FIG. 9 is a flowchart illustrating an example of operations of a resonant converter of a wireless power receiving apparatus.

Referring to FIG. 9, in a case in which a second energy storage device is currently included in the resonant converter, the wireless power receiving apparatus transfers energy stored in the second energy storage device to an output end of the wireless power receiving apparatus through the resonant converter in operations 910 and 920. In operation 910, during a first period in a first time interval, the wireless power receiving apparatus accumulates, in an inductor of the resonant converter, energy stored in the second energy storage device. In operation 920, during a second period in the first time interval, the wireless power receiving apparatus transfers energy stored in the inductor of the resonant converter to the output end. Operations 910 and 920 may be performed in a same time interval as the first time interval P1 of FIG. 8.

Subsequently, the wireless power receiving apparatus controls connections of components therein such that the first energy storage device, in lieu of the second energy storage device, is included in the resonant converter. The wireless power receiving apparatus transfers energy stored in the first energy storage device to the output end through the resonant converter in operations 930 and 940. In operation 930, during a first period in a second time interval, the wireless power receiving apparatus accumulates the energy stored in the first energy storage device in the inductor of the resonant converter. In operation 940, during a second period in the second time interval, the wireless power receiving apparatus transfers energy stored in the inductor of the resonant converter to the output end. Operations 930 and 940 may be performed in a same time interval as the second time interval P2 of FIG. 8. Subsequently, the wireless power receiving apparatus controls the connection of the components such that the second energy storage device, in lieu of the first energy storage device, is included in the resonant converter, and starts performing again from operation 910.

The wireless power receiving apparatus and components thereof, such as controller 145, in FIGS. 1-9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, oscillators, signal generators, inductors, capacitors, buffers, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by either one or both of analog electrical components, mixed mode components, and computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions, firmware, design model, or software include machine code that is directly executed by the one or more processors or computers, such as machine code produced by a compiler. In another example, the instructions, firmware, analog logic, or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions, firmware, or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

Although specific terminology has been used in this disclosure, it will be apparent after an understanding of the disclosure of this application that different terminology may be used to describe the same features, and such different terminology may appear in other applications.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power receiving apparatus comprising:
a receiving resonator configured to wirelessly receive energy;
a resonant converter configured to transfer, to an output end of the wireless power receiving apparatus, energy of an energy storage device connected among a plurality of energy storage devices; and
a controller configured to accumulate, alternatingly in the energy storage devices, the energy received, and select the energy storage device to be connected to the resonant converter among the energy storage devices,
wherein the receiving resonator comprises a first inductor to wirelessly receive the energy through resonant inductive coupling, and
the resonant converter comprises a second inductor having an inductance greater than an inductance of the first inductor.

2. The apparatus of claim 1, wherein the controller is configured to:
control the wireless power receiving apparatus such that energy received from the receiving resonator is accumulated in a first energy storage device and energy stored in a second energy storage device is transferred to the resonant converter, during a first time interval, and
control the wireless power receiving apparatus such that energy stored in the first energy storage device is transferred to the resonant converter and energy received from the receiving resonator is accumulated in the second energy storage device, during a second time interval.

3. The apparatus of claim 2, wherein the controller is configured to control an operation of a first switch to determine which one of the receiving resonator and the resonant converter is to be connected to the first energy storage device, and an operation of a second switch to determine which one of the receiving resonator and the resonant converter is to be connected to the second energy storage device.

4. The apparatus of claim 1, wherein the controller is configured to accumulate energy wirelessly received in another energy storage device, while the energy of the connected energy storage device is being transferred to the output end.

5. The apparatus of claim 1, wherein the controller is configured to detect a peak point of a voltage value of an energy storage device in which the energy received, from a transmitting resonator, is accumulated, and replace the energy storage device with another energy storage device in which the energy is to be accumulated in response to the detected peak point satisfying a preset condition.

6. The apparatus of claim 1, wherein the resonant converter is configured to accumulate, in the second inductor, energy stored in the energy storage device during a first period in a first time interval, and
transfer energy stored in the second inductor to the output end during a second period in the first time interval.

7. The apparatus of claim 6, wherein the resonant converter further comprises a switch to control the first period and the second period in the first time interval.

8. The apparatus of claim 1, wherein the resonant converter further comprises a diode disposed between the second inductor and the output end.

9. The apparatus of claim 1, wherein the second inductor is connected to the connected energy storage device in series.

10. The apparatus of claim 1, wherein the energy storage devices are capacitors.

11. A wireless power receiving apparatus comprising:
a receiving resonator configured to wirelessly receive energy;
energy storage devices configured to either one or both of store the wirelessly received energy and supply the stored wirelessly received energy; and
a controller configured to select, from the energy storage devices, a first energy storage device, configured to store the energy wirelessly received, and a second energy storage device, configured to supply energy to an output end of the wireless power receiving apparatus, to be connected to a resonant converter,
wherein the receiving resonator comprises a first inductor to wirelessly receive the energy through resonant inductive coupling, and
the resonant converter comprises a second inductor having an inductance greater than an inductance of the first inductor.

12. The apparatus of claim 11, wherein
the resonant converter is configured to transfer, to the output end, energy of an energy storage device currently connected.

13. A wireless power receiving method comprising:
accumulating energy wirelessly received in a first energy storage device and transferring energy stored in a second energy storage device to an output end through a resonant converter, during a first time interval; and
accumulating energy wirelessly received in the second energy storage device and transferring energy stored in the first energy storage device to the output end through the resonant converter, during a second time interval,
wherein the accumulating of the energy in the first energy storage device and the transferring of the energy stored in the second energy storage device to the output end comprises:
accumulating the energy stored in the second energy storage device in an inductor included in the resonant converter during a first period in the first time interval; and transferring the energy stored in the inductor to the output end during a second period in the first time interval.

14. A wireless power receiving method comprising:
accumulating energy wirelessly received in a first energy storage device and transferring energy stored in a second energy storage device to an output end through a resonant converter, during a first time interval; and
accumulating energy wirelessly received in the second energy storage device and transferring energy stored in the first energy storage device to the output end through the resonant converter, during a second time interval, wherein the accumulating of the energy in the second energy storage device and the transferring of the energy stored in the first energy storage device to the output end comprises:
accumulating the energy stored in the first energy storage device in an inductor included in the resonant converter during a first period in the second time interval; and
transferring the energy stored in the inductor to the output end during a second period in the second time interval.

15. The method of claim 13, further comprising:
detecting a peak point of a voltage value of the first energy storage device during the first time interval, and
in response to the detected peak point satisfying a preset condition, accumulating energy received by a receiving resonator in the second energy storage device.

16. The method of claim 13, further comprising:
detecting a peak point of a voltage value of the second energy storage device during the second time interval; and
in response to the detected peak point satisfying a preset condition, accumulating energy received by a receiving resonator in the first energy storage device.

17. The method of claim 13, wherein the accumulating energy wirelessly received in the first energy storage device and transferring energy stored in the second energy storage device to the output end through the resonant converter, during the first time interval is substantially simultaneously performed.

18. A wireless power receiving method comprising:
actuating a processor to
receive energy at a receiving resonator;
transfer, to an output, energy of an energy storage device connected among a plurality of energy storage devices; and
accumulate, alternatingly in the energy storage devices, the energy received, and
select the energy storage device connected to a resonant converter among the energy storage devices,
wherein the receiving resonator comprises a first inductor to wirelessly receive the energy through resonant inductive coupling, and
the resonant converter comprises a second inductor having an inductance greater than an inductance of the first inductor.

19. The method of claim 14, further comprising:
detecting a peak point of a voltage value of the first energy storage device during the first time interval, and
in response to the detected peak point satisfying a preset condition, accumulating energy received by a receiving resonator in the second energy storage device.

20. The method of claim 14, further comprising:
detecting a peak point of a voltage value of the second energy storage device during the second time interval; and
in response to the detected peak point satisfying a preset condition, accumulating energy received by a receiving resonator in the first energy storage device.

* * * * *